(12) United States Patent
Liao et al.

(10) Patent No.: US 6,642,674 B2
(45) Date of Patent: Nov. 4, 2003

(54) TWIN DIMMING CONTROLLER FOR BACKLIGHT SYSTEM

(75) Inventors: Yu-Shih Liao, Taipei (TW); Tsung-Ta Chen, Taipei (TW); Wen-Hung Huang, Taipei (TW)

(73) Assignee: Quanta Computer Inc., Taoyuan Hsien (TW)

( * ) Notice: Subject to any disclaimer, the term of this patent is extended or adjusted under 35 U.S.C. 154(b) by 0 days.

(21) Appl. No.: 10/095,759

(22) Filed: Mar. 8, 2002

(65) Prior Publication Data
US 2002/0153852 A1 Oct. 24, 2002

(30) Foreign Application Priority Data
Mar. 9, 2001 (TW) ...................................... 90203570 U

(51) Int. Cl.[7] ................................................. G05F 1/00
(52) U.S. Cl. ................. 315/291; 315/307; 315/DIG. 4; 315/297
(58) Field of Search ................................ 315/291, 307, 315/DIG. 4, 297, 224, 225

(56) References Cited
U.S. PATENT DOCUMENTS

| | | | | |
|---|---|---|---|---|
| 5,939,840 A | * | 8/1999 | Nakagawa et al. | .......... 315/307 |
| 6,069,448 A | * | 5/2000 | Yeh | .............................. 315/149 |
| 6,229,720 B1 | * | 5/2001 | Noma et al. | ................... 363/40 |
| 6,445,143 B1 | * | 9/2002 | Min | ............................ 315/307 |

* cited by examiner

Primary Examiner—Hoang Nguyen
Assistant Examiner—Tuyet T. Vo
(74) Attorney, Agent, or Firm—Perkins Coie LLP

(57) ABSTRACT

A twin dimming controller for backlight system is disclosed. In the present invention, the output of pulse width modulation modulator is used as a reference voltage of error-feedback amplifier and frequency compensation loop in backlight controller having pulse dimming control, and meanwhile, the output of pulse width modulation modulator is sent to the output terminal of error-feedback amplifier and frequency compensation loop. Therefore, by utilizing the present invention, the peaked lamp current and the working period of lamp current are adjusted at the same time for adjusting the output power of lamp, and with the same working period of lamp current, the dimming range is broader, and the minimum power consumption of lamp is decreased substantially.

3 Claims, 5 Drawing Sheets

TWIN DIMMING CONTROLLER FOR BACKLIGHT SYSTEM

FIELD OF THE INVENTION

The present invention relates to a dimming controller for backlight system, and more particularly relates to a twin dimming controller which can adjust the peaked lamp current and operation period simultaneously.

BACKGROUND OF THE INVENTION

Recently, to follow the fast progress of technologies and increasing application aspects of portable computer, the demand of portable computer is increased substantially, and thus the required standards of size, weight and battery lifetime of portable computer are relatively stricter. In a liquid crystal display (LCD) panel, a backlight controller is utilized to control the dimming operation of cold cathode fluorescent lamp (CCFL), and normally, a conventional analog dimming control (ADC) method is utilized to adjust lamp current for adjusting brightness. However, the backlight cannot be adjusted to be too dim, or uneven brightness will be resulted in. Thus, backlight power source cannot be set too low, which means that the working time of portable computer cannot last very long outdoors. In order to extend the working time of portable computer, many power-saving modes about backlight power source have been researching currently.

One of the most frequently improvement methods adapted is a pulse dimming control (PDC) method, or called burst mode control method. Basically, the PDC method utilizes a pulse modulation method to adjust the working period of lamp current for controlling the panel brightness. Please referring to FIG. 1, FIG. 1 is a diagram showing the working period of lamp current generated by PDC method. With 100% working period of pulse width, the outputted lamp current is at the maximum, and with the decreased working period, the working period of lamp current also is decreased, leading to less the panel brightness. Theoretically, with a shorter working period of pulse width, the panel brightness is lower, and thus the input power required by backlight controller is smaller. However, it is a disadvantage of PDC method that a flicker phenomenon of image is likely to be induced by the insufficient pulse modulation width caused by an overly short working period of pulse. The bottom line of safety for working period of pulse width is about 20% to 30%.

Please referring to FIG. 2, FIG. 2 is a diagram showing the circuit of a conventional analog dimming controller. As shown in FIG. 2, the circuit is mainly divided into a buck stage 100, an error-feedback amplifier and frequency compensation loop 200, and a resonant push-pull stage circuit 300. The resonant push-pull stage circuit 300 is constructed with a transformer T1, a resonant capacitor $C_R$, and two interactive switch transistors Q2 and Q3. The resonant frequency is determined by the primary inductance $L_P$ of transformer T1, turn ratio N, resonant capacitor $C_R$ and capacitor $N^2 C_B$ returned from the secondary side of transformer T1, $$f_r \approx \frac{1}{2\pi\sqrt{L_p(C_R + N^2 C_B)}}$$

wherein $C_B$ is ballast capacitor of backlight controller.

As shown in FIG. 2, the analog dimming control is utilized in conventional CCFL, and the lamp current thereof is a light-adjusting method of continuous output. Generally, a DC average is obtained by first connecting a variable resistor $R_{V1}$ and a fixed resistor $R_S$ for forming an induced current, and then via a rectifiable diode D2. Then the DC average is inputted to the error-feedback amplifier and frequency compensation loop 200 for adjusting the lamp current. Thus, the lamp current is $$I_{LAMP} = \frac{\left[V_{REF1} + \frac{V_D}{2}\right]\pi}{\sqrt{2}\,(R_{V1} + R_S)}$$

The aforementioned analog dimming control method is frequently limited by the minimum lamp current so as to prevent uneven brightness from occurring. Therefore, the lamp current cannot be adjusted too small, whereby the dimming range is limited.

Hence, a backlight control circuit with pulse dimming control shown in FIG. 3 is implemented widely. Please referring to FIG. 3, FIG. 3 is a diagram showing a backlight control circuit with pulse dimming control. By utilizing an additional pulse width modulation (PWM) modulator 400, the pulse generated by PWM modulator 400 enters the input terminal or the output terminal of error-feedback amplifier and frequency compensation loop 200, so that the CCFL current has a regular switch ON/OFF interval in accordance with the change of working period under a fixed low frequency, thereby efficiently decreasing the valid value of lamp current to achieve the objective of changing the brightness of lamp. At this time, the lamp current is outputted under a PWM mode, but the peak value of lamp current is not changed, so that with the shorter working period, the smaller lamp current is smaller accordingly, and the overall consumptive power of backlight controller can be maintained at a minimum status for attaining the goal of power saving.

Please referring to FIG. 4, FIG. 4 is a diagram showing the working period of lamp current that is less than 20%. If the lamp current is smaller than 1.2 mA, the working period of lamp current is smaller than 20% or more, so that the switch-ON time of lamp current is less than the soft-starting time of buck stage 100. Thus, the lamp current becomes unstable, and the entire LCD image is likely to appear a flicker phenomenon. As shown in FIG. 4, the working period of lamp current that is less than 20% indicates the unstable status. Therefore, the smallest working period has to be set at 20% or over 30% to avoid this flicker phenomenon, so that the dimming range is limited and can only reaches 1:10, and the minimum power consumption of lamp can be only down to 0.6 W, and if the panel brightness of LCD is lower than 10 Nits, the flicker phenomenon occurs.

SUMMARY OF THE INVENTION

In the view of the background of the invention described above, there are some disadvantages, such as that the dimming range of backlight controller with PDC is limited to 1:10, and the minimum power consumption of lamp is 0.6 W. Therefore, the present invention proposes a twin dimming controller for backlight system to resolve the aforementioned problems.

It is the principal object of the present invention to provide a twin dimming controller for backlight system. In the present invention, the output of PWM modulator is used as the referenced voltage of error-feedback amplifier and frequency compensation loop, and is connected to the output terminal of error-feedback amplifier and frequency compensation loop at the same time. Thus, the present invention can adjust the peaked lamp current and the working period of pulse width for adjusting the output power of lamp.

It is another object of the present invention to provide a twin dimming controller for backlight system. By utilizing the present invention, the dimming range is broader with the same working period of lamp current, and the minimum power consumption of lamp is decreased substantially.

In accordance with the aforementioned purpose of the present invention, the present invention provides a twin dimming controller for backlight system, comprising: a buck stage, a resonant push-pull stage circuit connecting with the buck stage power for generating a lamp current having resonant frequency, a ballast capacitor connected in series with CCFL between the output terminal of resonant push-pull stage circuit and the input terminal of error-feedback amplifier and frequency compensation loop, a resistor connected in parallel with a first diode between the output terminal of resonant push-pull stage circuit and a ground voltage, an output terminal of PWM modulator connected to an output terminal of error-feedback amplifier and frequency compensation loop, a n-type terminal of second diode connected to the output terminal of PWM modulator and a p-type terminal of second diode connected to an referenced voltage of error-feedback amplifier and frequency compensation loop.

In accordance with the aforementioned purpose of the present invention, the present invention provides a twin dimming controller for backlight system, the characteristic of the present invention is the PWM signal outputted from PWM modulator of backlight controller having PDC sent to the n-type terminal of diode, and the p-type terminal of diode connected to the reference terminal of error-feedback amplifier and frequency compensation loop.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As the aforementioned description, ADC method is utilized to adjust lamp current for brightness adjustment, and the backlight controller having PDC is utilized to adjust the working period of lamp current for brightness adjustment.

Figure 1:
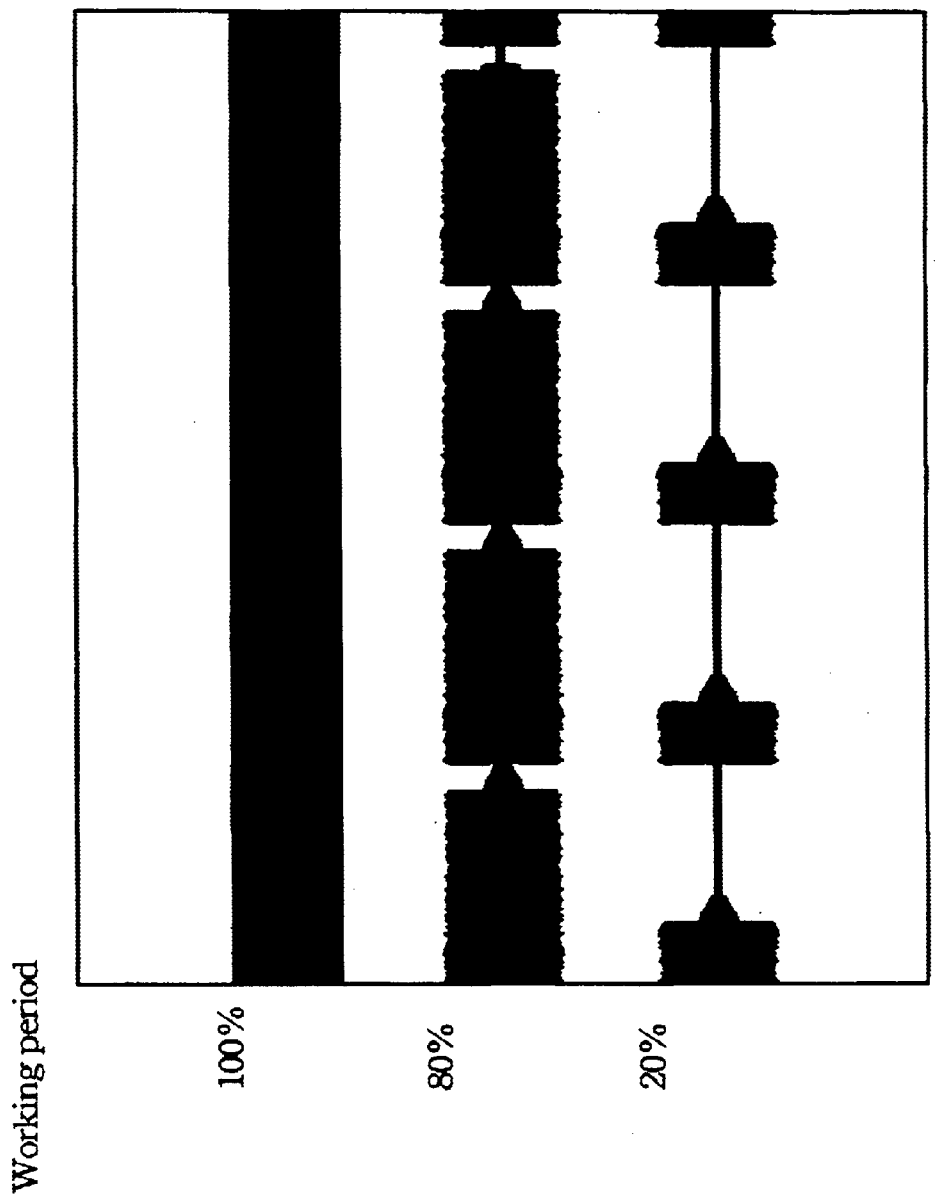
FIG. 1 is a diagram showing the working period of lamp current generated by PDC method.
Figure 2:
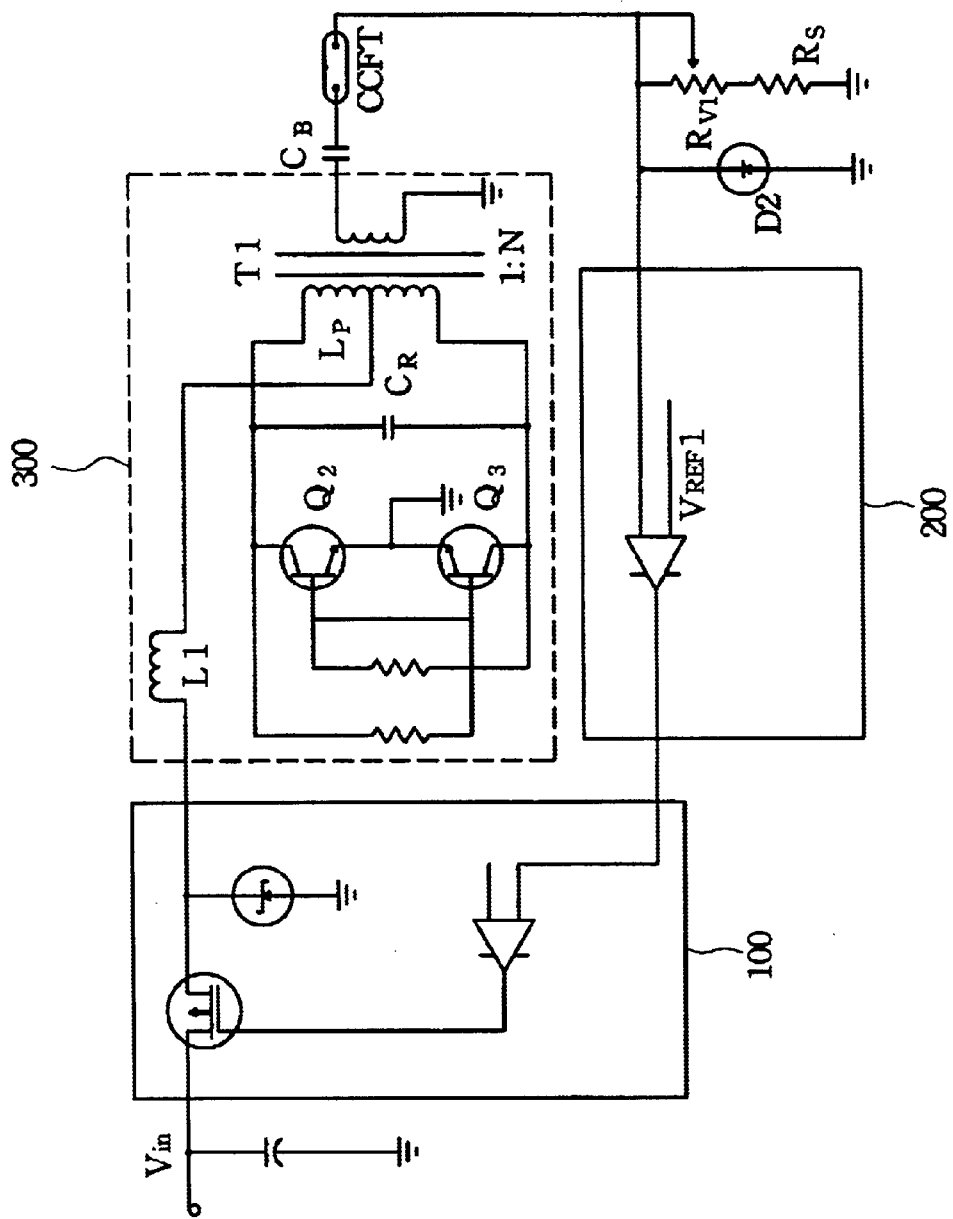
FIG. 2 is a diagram showing the circuit of a conventional analog dimming controller.
Figure 3:
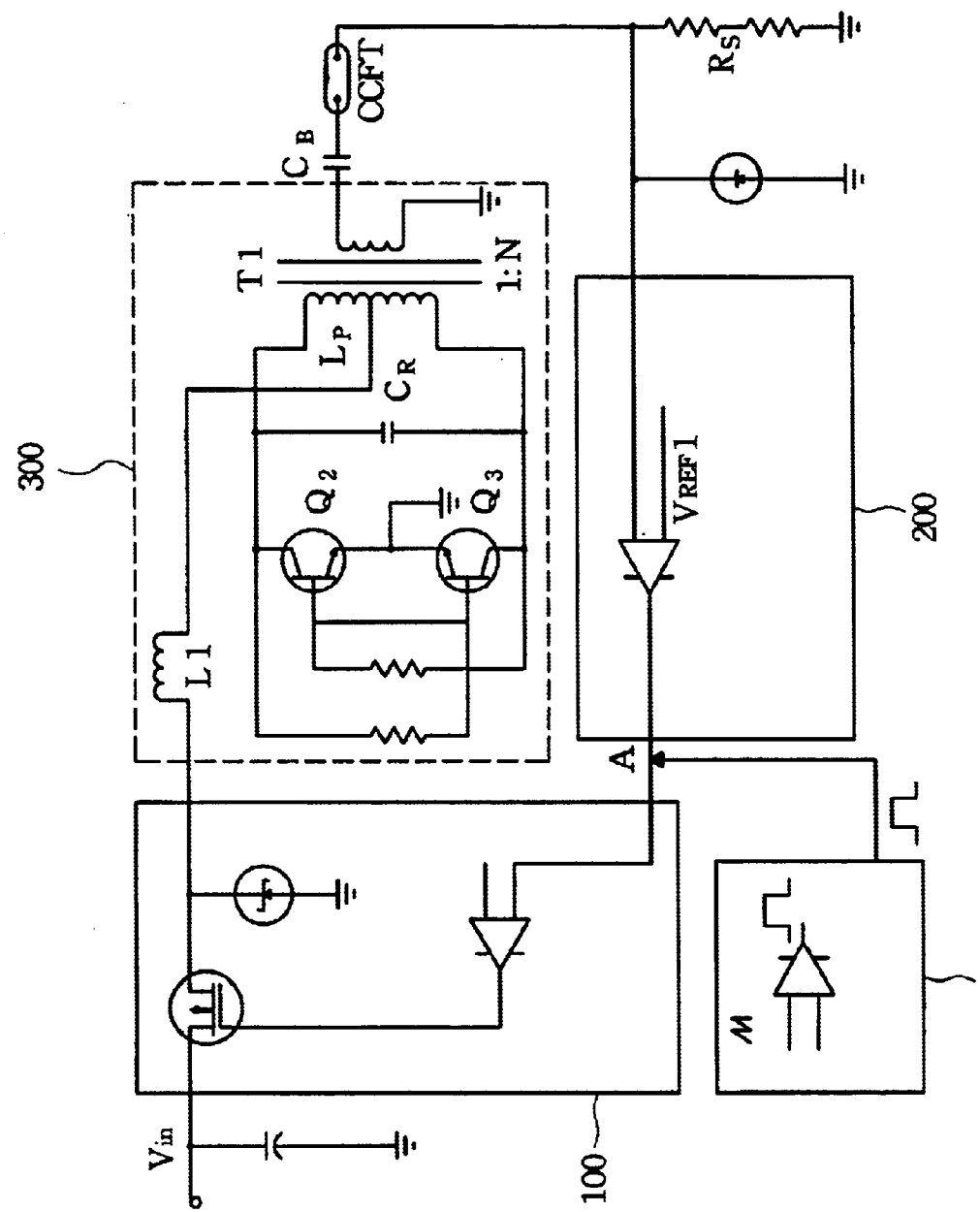
FIG. 3 is a diagram showing a backlight control circuit with pulse dimming control.
Figure 4:
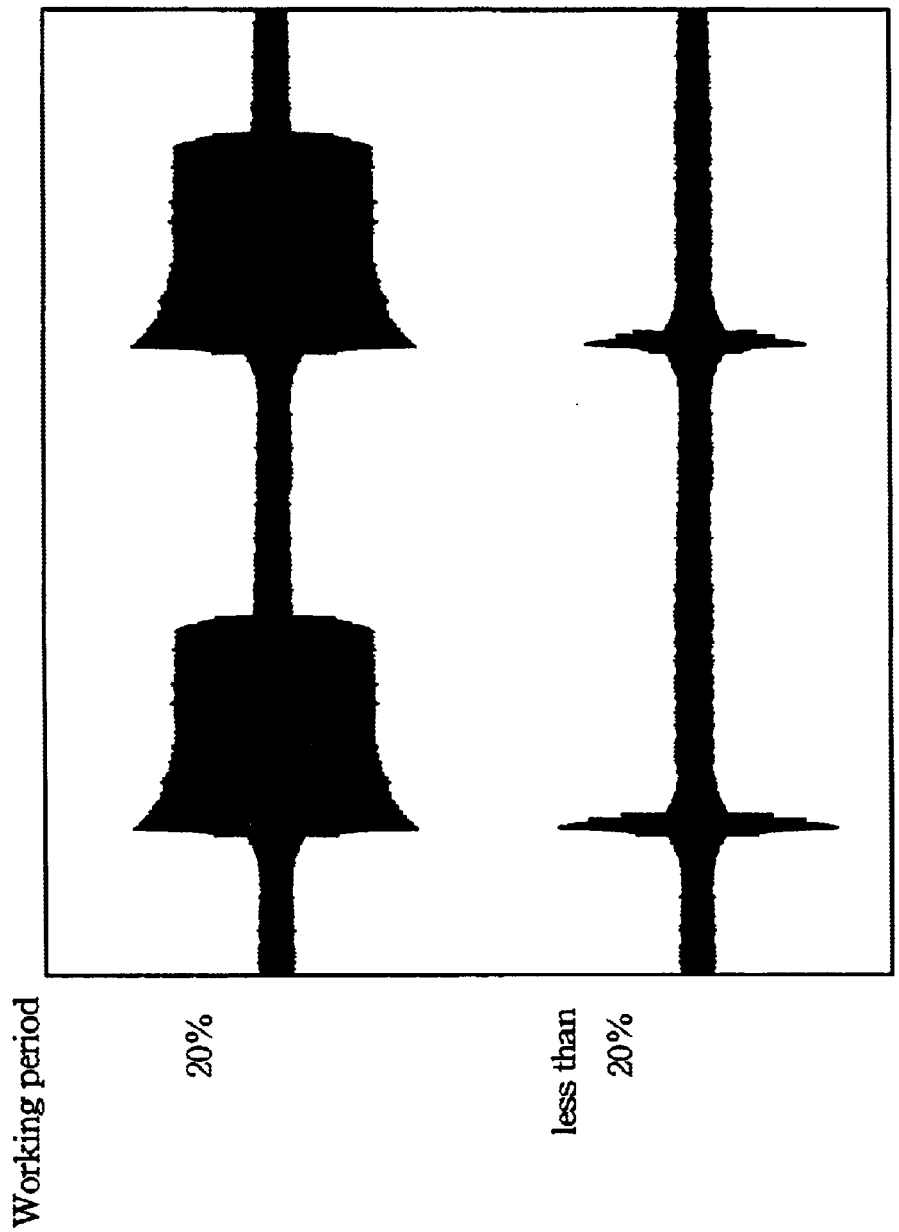
FIG. 4 is a diagram showing the working period of lamp current that is less than 20%.
Figure 5:
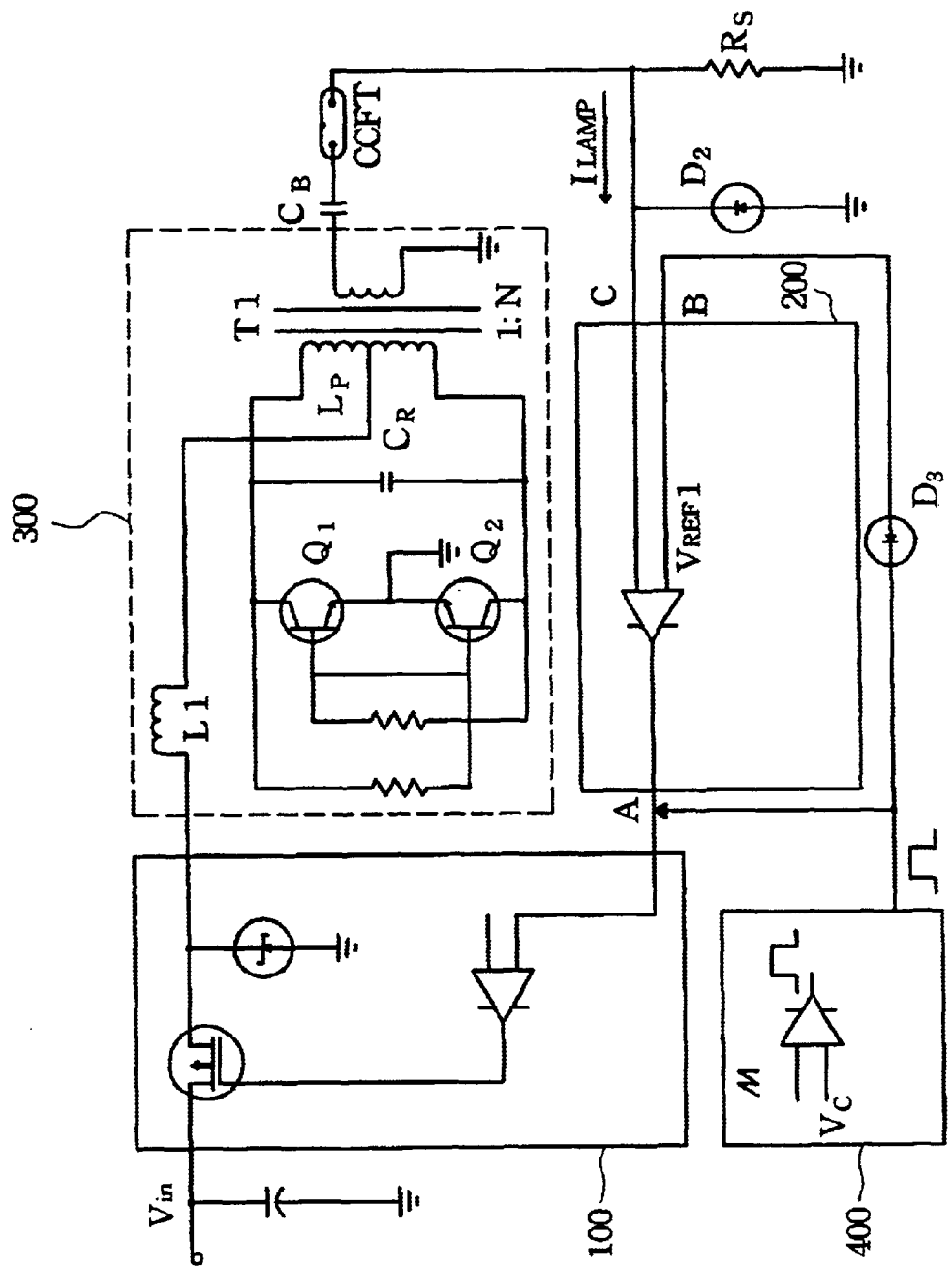
FIG. 5 is a diagram showing the circuit of twin dimming controller for backlight system, according to the present invention.

Referring to FIG. 5, FIG. 5 is a diagram showing the circuit of twin dimming controller for backlight system, according to the present invention. As shown in FIG. 5, there are a buck stage 100, an error-feedback amplifier and frequency compensation loop 200, and a resonant push-pull stage circuit 300, and the output terminal of PWM modulator 400 is connected with a n-type terminal of diode D3, and a p-type terminal of diode D3 is connected to a reference voltage ($V_{REF1}$) of error-feedback amplifier and frequency compensation loop 200, and meanwhile the output terminal of PWM modulator 400 is connected to the output terminal of error-feedback amplifier and frequency compensation loop 200. Therefore, by adjusting the peaked lamp current and the working period of lamp current, the output power of lamp is adjusted in the present invention.

A PWM pulse of PWM modulator 400 is generated by comparing a triangular pulse and a comparing voltage in a comparator, so that the working period of PWM pulse can be controlled by controlling the value of the comparing voltage.

First, for generating a switch ON/OFF working period, a PWM pulse of PWM modulator 200 is sent to the output terminal of error-feedback amplifier and frequency compensation loop 200 (such as point A shown in FIG. 5).

Meanwhile, the PWM pulse of PWM modulator 400 is sent to the n-type terminal of diode D3, and the p-type terminal of diode D3 is connected to the reference voltage ($V_{REF1}$), (such as point B shown in FIG. 5), for adjusting the level of reference voltage by PWM pulse. While the working period of PWM pulse is varied, the reference voltage ($V_{REF1}$) of error-feedback amplifier and frequency compensation loop 200 is also changed. If the working period of PWM pulse becomes shorter, the average value of reference voltage ($V_{REF1}$) also becomes smaller, and the peaked lamp current is decreased while being switched ON due to the reduction of reference voltage. Therefore, the peaked lamp current and the working period of lamp current are adjusted at the same time.

According to this embodiment, when 8-inches LCD panel is utilized, the panel brightness of LCD can be lowered to 5 Nits, and the power consumption thereof can be further decreased to 0.2 W to 0.3 W lower than that of backlight controller having PDC. Moreover, with the same working period of lamp current, the panel brightness is further lowered, and the dimming range can achieves the range of 1:20 or over.

Hence, the primary advantage of the present invention is to provide a twin dimming controller for backlight system. In the backlight controller having PDC, the output of PWM modulator is used as the reference voltage of error-feedback amplifier and frequency compensation loop, and meanwhile the output terminal of PWM modulator is connected to the output terminal of error-feedback amplifier and frequency compensation loop, so that, in the present invention, the peaked lamp current and the working period of lamp current can be adjusted at the same time.

Another advantage of the present invention is to provide a twin dimming controller for backlight system. By utilizing the present invention, the dimming range is broader with the same working period of lamp current, and the minimum power consumption of lamp is decreased substantially.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A twin dimming controller for backlight system, comprising:

a buck stage connecting with a power source;

a resonant push-pull stage circuit connected with the bulk stage for generating a lamp current having a resonant frequency;

a ballast capacitor, and one side of the ballast capacitor connected to an output terminal of the resonant push-pull stage circuit for outputting the lamp current;

a cold cathode fluorescent lamp, and one side of the cold cathode fluorescent lamp connected to another side of the ballast capacitor for the lamp current through the cold cathode fluorescent lamp;

a resistor located between another side of the cold cathode fluorescent lamp and a ground voltage;

a first diode connected with the resistor in parallel, and a p-type terminal of the first diode connected to the ground voltage;

an error-feedback amplifier and frequency compensation loop having an input terminal and a reference voltage terminal, and the input terminal of the error-feedback amplifier and frequency compensation loop connected to the another side of the cold cathode fluorescent lamp, and an output terminal of the error-feedback amplifier and frequency compensation loop connected to the buck stage;

a pulse width modulation modulator, which generates a pulse width modulation signal by comparing a triangular pulse and a comparing voltage, and an output terminal of the pulse width modulation modulator connected to the output terminal of the error-feedback amplifier and frequency compensation loop for inputting the pulse width modulation signal; and a second diode, and a n-type terminal of the second diode connected to the output terminal of the pulse width modulation modulator, and a p-type terminal of the second diode connected to the reference voltage terminal of the error-feedback amplifier and frequency compensation loop.

2. A twin dimming controller for backlight system as recited in claim 1, wherein the characteristic is a pulse width modulation signal outputted from a pulse width modulation modulator of the backlight controller having a pulse dimming control sent to a n-type terminal of the diode, and a p-type terminal of the diode connected to a reference voltage terminal of an error-feedback amplifier and frequency compensation loop.

3. A twin dimming controller for backlight system, comprising:

a buck stage connecting with a power source;

a resonant push-pull stage circuit connected with the buck stage for generating a lamp current having a resonant frequency;

a ballast capacitor, and one side of the ballast capacitor connected to an output terminal of the resonant push-pull stage circuit for outputting the lamp current;

a cold cathode fluorescent lamp, and one side of the cold cathode fluorescent lamp connected to another side of the ballast capacitor for the lamp current through the cold cathode fluorescent lamp;

a resistor located between another side of the cold cathode fluorescent lamp and a ground voltage;

a first diode connected with the resistor in parallel, and a p-type terminal of the first diode connected to the ground voltage;

an error-feedback amplifier and frequency compensation loop having an input terminal and a reference voltage terminal, and the input terminal of the error-feedback amplifier and frequency compensation loop connected to the another side of the cold cathode fluorescent lamp, and an output terminal of the error-feedback amplifier and frequency compensation loop connected to the buck stage;

a pulse width modulation modulator for generating a pulse width modulation signal by comparing a triangular pulse and a comparing voltage, and an output terminal of the pulse width modulation modulator connected to the output terminal of the error-feedback amplifier and frequency compensation loop for inputting the pulse width modulation signal; and a second diode, and a n-type terminal of the second diode connected to the output terminal of the pulse width modulation modulator, and a p-type terminal of the second diode connected to the reference voltage terminal of the error-feedback amplifier and frequency compensation loop, wherein said reference voltage terminal receives the pulse width modulation signal through said second diode to adjust the level of reference voltage.

* * * * *